United States Patent [19]

Suganuma et al.

[11] Patent Number: 5,220,626
[45] Date of Patent: Jun. 15, 1993

[54] METHOD OF SMOOTHLY COMBINING SIGNALS FROM OVERLAPPING SENSORS

[75] Inventors: Atsushi Suganuma; Hisayoshi Monma, both of Kanagawa, Japan

[73] Assignee: Fuji Photo Film Co., Ltd., Kanagawa, Japan

[21] Appl. No.: 979,484

[22] Filed: Nov. 20, 1992

Related U.S. Application Data

[63] Continuation of Ser. No. 779,155, Oct. 21, 1991, abandoned, which is a continuation of Ser. No. 538,446, Jun. 15, 1990, abandoned.

[30] Foreign Application Priority Data

Jun. 21, 1989 [JP] Japan .................................. 1-159875

[51] Int. Cl.$^5$ .............................................. H04N 1/04
[52] U.S. Cl. .................................... 358/483; 358/443; 358/445; 382/67
[58] Field of Search ............................ 382/45, 62, 67; 358/443–445, 447, 482–483, 212, 213.16

[56] References Cited

U.S. PATENT DOCUMENTS 4,564,864 1/1986 Maeshima .......................... 358/280
4,692,812 9/1987 Hirahara et al. ..................... 358/285

FOREIGN PATENT DOCUMENTS 0116865 7/1983 Japan ................................... 358/483
0130670 8/1983 Japan ................................... 358/483

*Primary Examiner*—David K. Moore
*Assistant Examiner*—Andrew W. Johns
*Attorney, Agent, or Firm*—Sughrue, Mion, Zinn, Macpeak & Seas

[57] ABSTRACT

An image signal is produced by adding output signals from arrays of photoelectric transducer elements of adjacent two of a plurality of image sensors. Output signals from all of the image sensors are combined into an image signal representative of image information along one main scanning line. One of the output signals is gradually increased from an actual level thereof to a predetermined offset level in an interval during which the output signals start being added to each other. The other of the output signals is gradually reduced from the predetermined offset level to an actual level thereof in an interval during which the output signals stop being added to each other, whereby the output signals are smoothly combined with each other.

2 Claims, 5 Drawing Sheets

METHOD OF SMOOTHLY COMBINING SIGNALS FROM OVERLAPPING SENSORS

This is a continuation of application Ser. No. 07/779,155 filed Oct. 21, 1991, now abandoned, which is a continuation of application Ser. No. 07/538,446 filed Jun. 15, 1990, now abandoned.

BACKGROUND OF THE INVENTION

The present invention relates to a method of processing an image signal produced as an output signal from a photoelectric transducer device used in a facsimile receiver/transmitter, a platemaking image reading apparatus, or the like.

Image scanning reproducing systems are widely used in the printing and platemaking industries for electrically processing image information of originals or subjects to produce original film plates with a view to simplifying the entire process and improving the quality of printed images.

The image scanning reproducing systems are basically constructed of an image reading apparatus and an image recording apparatus. In the image reading apparatus, image information of an original or subject which is fed in an auxiliary scanning direction by an image reader is scanned by image sensors in a main scanning direction substantially norma to the auxiliary scanning direction, and the scanned image information is converted into an electric signal.

Then, the photoelectrically converted image information is processed for gradation correction, edge sharpness, etc. according to platemaking conditions. Thereafter, the processed image signal is converted into a light signal such as a laser beam signal, which is applied to and recorded on an image recording medium of a photosensitive material such as a photographic film. The image recording medium with the image recorded thereon is developed by an image developing device and will be used as a film plate for printing.

The image sensors of the image reading apparatus generally comprise a plurality of series-connected CCD image sensors each of which is composed of an array of thousands of photoelectric transducer elements known as charge-coupled devices (CCDs).

More specifically, the image sensors are connected optically in series in order to read, with a high resolution, an original which is wide in the main scanning direction. Image information signals, which are obtained by photoelectric conversion using the image sensors, are electrically combined (added) into an electric image signal which corresponds to the original image information.

Even when no light falls on the photoelectric transducer elements, they develop a voltage at a dark level based on a dark current which flows in the semiconductor devices. The dark-level voltage varies from image sensor to image sensor because the dark current flowing in the photoelectric transducer elements varies from image sensor to image sensor.

When the output signals from adjacent image sensors are added, there is developed a level difference between the combined output signals, and such a level difference results in an unwanted level shift in the image signal. As a consequence, an image which is reproduced from the image signal suffers brightness irregularities, which manifest themselves particularly if the original image is high in density.

SUMMARY OF THE INVENTION

It is a principal object of the present invention to provide a method of processing an image signal by varying the values of output signals from photoelectric transducer elements such that two output signals to be added together are gradually increased or decreased with time between the actual levels of the output signals and a predetermined offset level, thereby reducing abrupt brightness irregularities which would otherwise be produced in a reproduced image due to a sharp level difference in the output signals.

Another object of the present invention is to provide a method of processing an image signal which is produced by combining output signals from arrays of photoelectric transducer elements of adjacent two of a plurality of image sensors while adding said output signals partly together, such that output signals from all of the image sensors are combined into an image signal representative of image information along one main scanning line, the method comprising the steps of gradually increasing one of the output signals from an actual level thereof to a predetermined offset level in an interval during which the output signals start being added to each other, and gradually reducing the other of the output signals from the predetermined offset level to an actual level thereof in an interval during which the output signals stop being added to each other, whereby the output signals are smoothly combined with each other.

Still another object of the present invention is to provide the method wherein the gradually increasing step comprises the step of multiplying said one of the added output signals by a coefficient signal which gradually increases from a time when the output signals start being added to each other, and wherein the gradually reducing step comprises the step of multiplying said other of the added output signals by a coefficient signal which gradually decreases from a time when the output signals stop being added to each other, the method further including the step of adding the multiplied output signals to each other to smoothly combine the output signals with each other.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
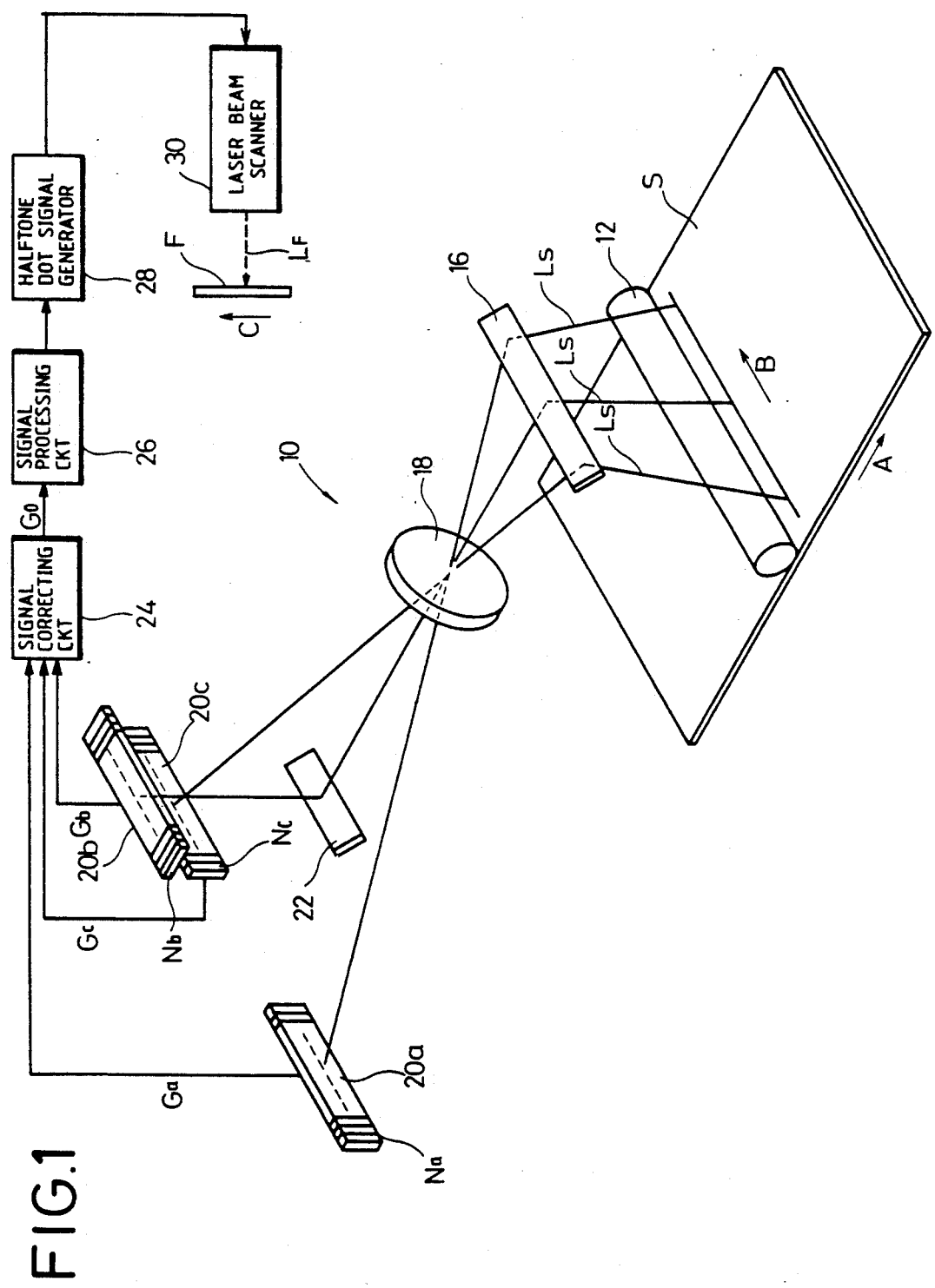
FIG. 1 is a schematic perspective view, partly in block form, of an image reading apparatus incorporating an image signal processing method according to the present invention.

FIG. 1 shows an image reading apparatus 10 in an image scanning system in which an image signal processing method according to the present invention is incorporated.

The image reading apparatus 10 comprises a light source 12 for illuminating image information recorded on an original or subject S, and a plurality of image sensors 20a through 20c such as CCD image sensors for detecting light Ls reflected from the illuminated original S through a first mirror 16 and a condenser lens 18. The image sensors 20a through 20c comprises respectively arrays of several thousands of photoelectric transducer elements Na, Nb, Nc such as photodiodes.

The image sensors 20a, 20c are aligned longitudinally with, and spaced from, each other, and the image sensor 20b is positioned upwardly and forwardly of the image sensors 20a, 20c. A second mirror (semireflecting mirror) 22 is positioned between the condensor lens 18 and the image sensors 20a, 20c, and the image sensor 20b is positioned above the mirror 22. When viewed from the condenser lens 18, the mirror 22 is positioned substantially between the image sensors 20a, 20c. The image sensors 20a, 20b, 20c and the mirror 22 are relatively positioned such that the photoelectric transducer elements Nb at the opposite longitudinal ends of the image sensor 20b optically overlap the photoelectric transducer elements Na, Nc at the confronting ends of the image sensors 20a, 20c near the image sensor 20b in optical conjugate relation through the mirror 22.

The original S is fed in an auxiliary scanning direction indicated by the arrow A by a feed mechanism (not shown), while the original S is being scanned in a main scanning direction indicated by the arrow B and normal to the auxiliary scanning direction, by the image sensors 20a through 20c. Therefore, any image information recorded on the original S is two-dimensionally read in its entirety.

Electric signals which are produced by the image sensors 20a through 20c through photoelectric conversion correspond to the image information recorded on the original S. The electric signals are fed as image signals Ga, Gb, Gc from the image sensors 20a through 20c, respectively, to a signal correcting circuit 24, which then corrects the image signals Ga, Gb, Gc into a corrected image signal Go that is applied to a signal processing circuit 26.

The corrected image signal Go applied to the signal processing circuit 26, which processes the signal for gradation correction, edge sharpness, etc., and the processed image signal is applied to a halftone dot image signal generator 28. Based on a given halftone dot signal, the half-tone dot image signal generator 28 converts the applied processed image signal into a binary signal, which is then applied to a laser beam scanner 30.

The laser beam scanner 30 turns on and off a laser beam LF based on the applied binary signal. The laser beam LF which is thus turned on and off is deflected by a light beam deflector (not shown) and scans a photographic film F to form a halftone dot image thereon.

More specifically, the laser beam LF scans the photographic film F in a main scanning direction (normal to the sheet of FIG. 1) while the photographic film F is being fed in an auxiliary scanning direction indicated by the arrow C and normal to the main scanning direction. Therefore, the image information recorded o the original S is two-dimensionally reproduced on the photographic film F.

Figure 2:
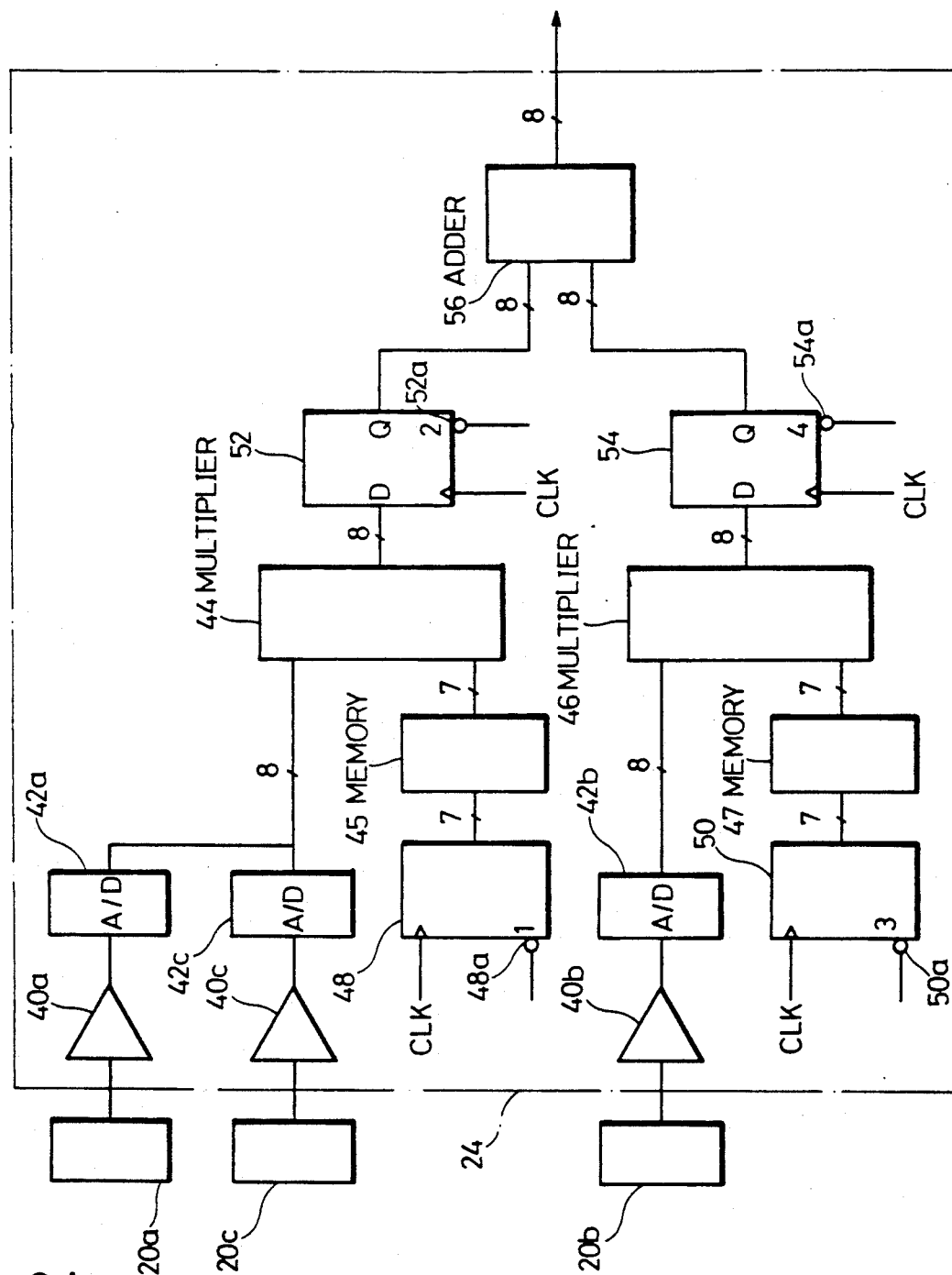
FIG. 2 is a block diagram of a signal correcting circuit for carrying out the image signal processing method of the present invention.

As shown in FIG. 2, the signal correcting circuit 24 has two multipliers 44, 46 to which the output signals from the image sensor 20a (or 20c) and 20b and output signals from memories 45, 47 are applied.

The output signal from the image sensor 20a is first amplified to an offset level (50 mV in the illustrated embodiment) by an amplifier 40a. The amplified signal is then applied to an A/D converter 42a and converted thereby into an 8-bit digital signal that is supplied to the multiplier 44.

The output signal from the image sensor 20c is first amplified to an offset level by an amplifier 40c, and the amplified signal is then applied to an A/D converter 42c and converted thereby into an 8-bit digital signal that is supplied to the multiplier 44.

The output signal from the image sensor 20b is first amplified to an offset level by an amplifier 40b, and the amplified signal is then applied to an A/D converter 42b and converted thereby into an 8-bit digital signal that is supplied to the multiplier 46.

7-bit digital signals from respective counters 48, 50 are applied to the memories 45, 47 to address the same. Digital signals corresponding to preset constants stored in the specified addresses are then sent to the respective multipliers 44, 46.

The multipliers 44, 46 produce respective 8-bit digital signals which are applied to latches 52, 54, respectively. When a voltage applied to a gate 52a (gate 2) of the latch 52 is of a high level, the 8-bit- digital signal applied from the multiplier 44 is delivered as an 8-bit digital signal from the latch 52 to an adder 56. Likewise, when a voltage applied to a gate 54a (gate 4) of the latch 54 is of a high level, the 8-bit digital signal applied from the multiplier 46 is delivered as an 8-bit digital signal from the latch 54 to the adder 56.

When the voltage applied to the gate 52a or 54a is of a low level, the latch 52 or 54 is reset, and the 8-bit digital signal delivered from the latch 52 or 54 becomes "0" (logic 0).

Figure 3:
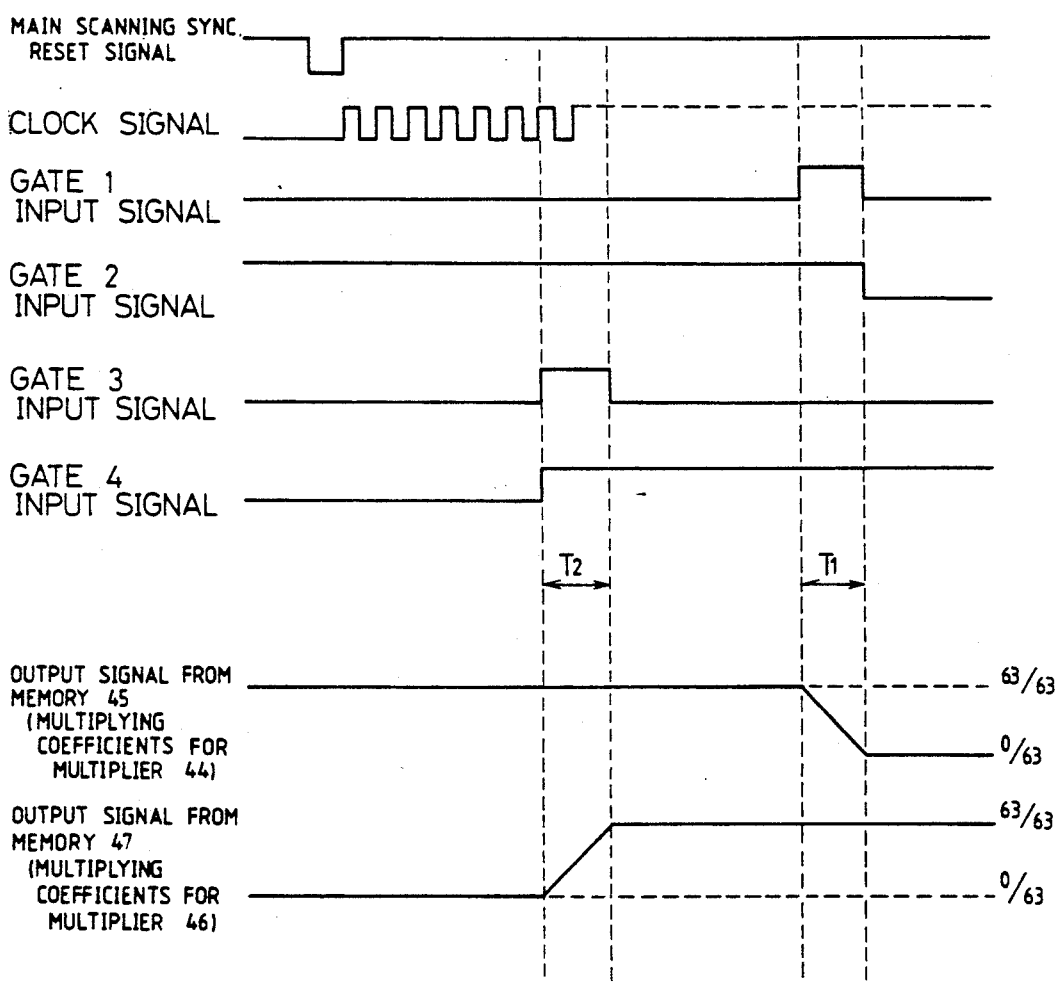
FIG. 3 is a timing chart of signals in the signal correcting circuit shown in FIG. 2.
Figure 4:
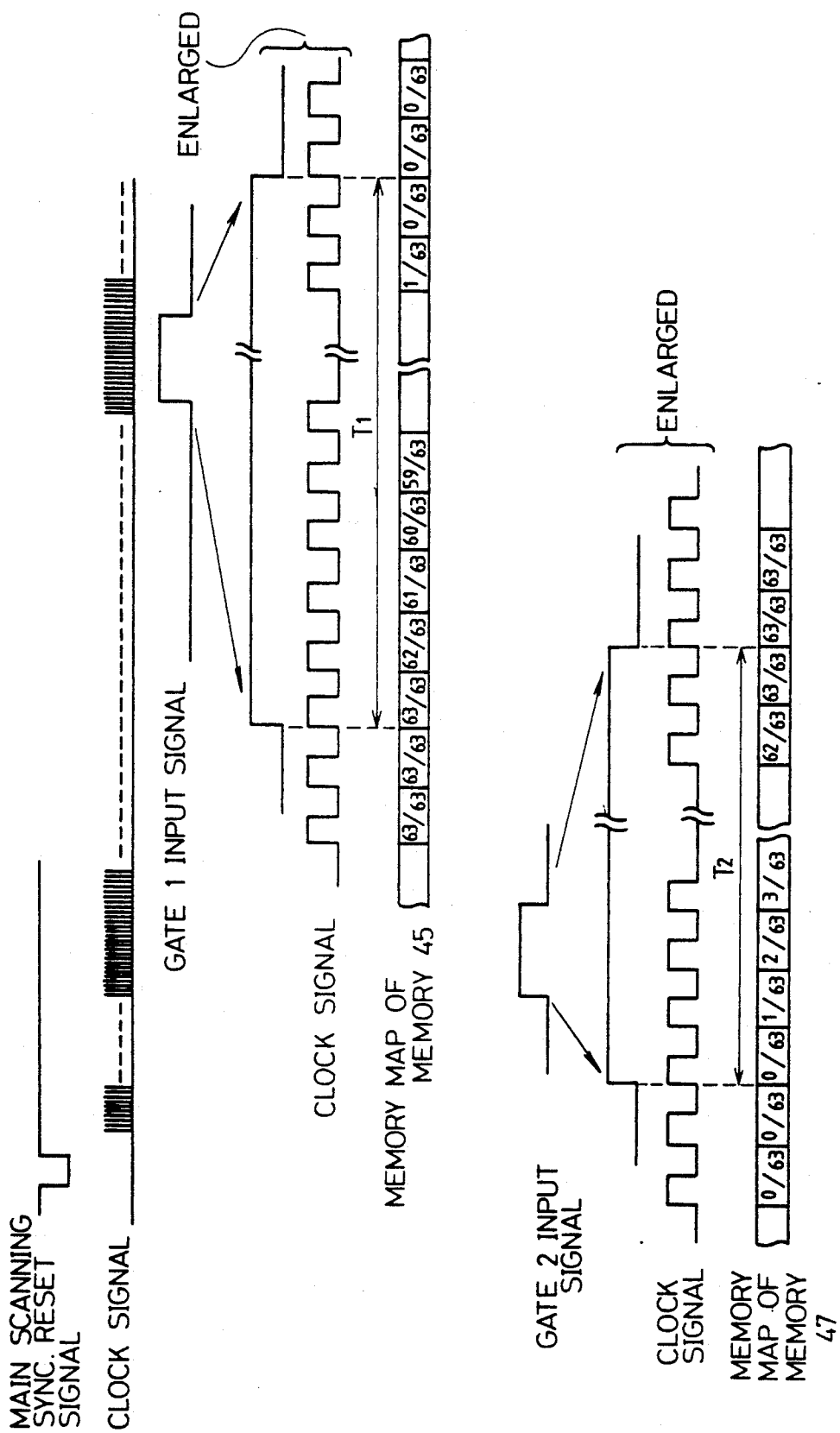
FIG. 4 is a timing chart showing in detail the relationship between input signals applied to gates and output signals from memories in the signal correcting circuit.

As shown in FIGS. 3 and 4, while a voltage applied to a gate 48a (gate 1) of the counter 48 is high in level (during an interval T1), the count of the counter 48 is successively decremented from "63" to "0", and the counter 48 successively produces 7-bit digital output signals, which correspond respectively to decrements from "63" to "0", as addressing signals for the memory 45 in response to respectively clock pulses of a clock signal applied to the counter 48. As shown in FIG. 4, the memory 45 stores, in its memory map, constants (multiplying coefficients) "63/63", "62/63", ... "1/63", "0/63" corresponding respectively to the 7-bit digital output signals which ar successively applied from the counter 48.

While a voltage applied to a gate 50a (gate 3) of the counter 50 is high in level (during an interval T2), the count of the counter 50 is successively incremented from "0" to "63", and the counter 50 successively produces 7-bit digital output signals, which correspond respectively to increments from "0" to "63", as addressing signals for the memory 47 in response to respectively clock pulses of the clock signal applied to the counter 50. As shown in FIG. 4, the memory 47 stores, in its memory map, constants (multiplying coefficients) "0/63", "1/63", ... "62/63", "63/63" corresponding respectively to the 7-bit digital output signals which are successively applied from the counter 50.

Figure 5:
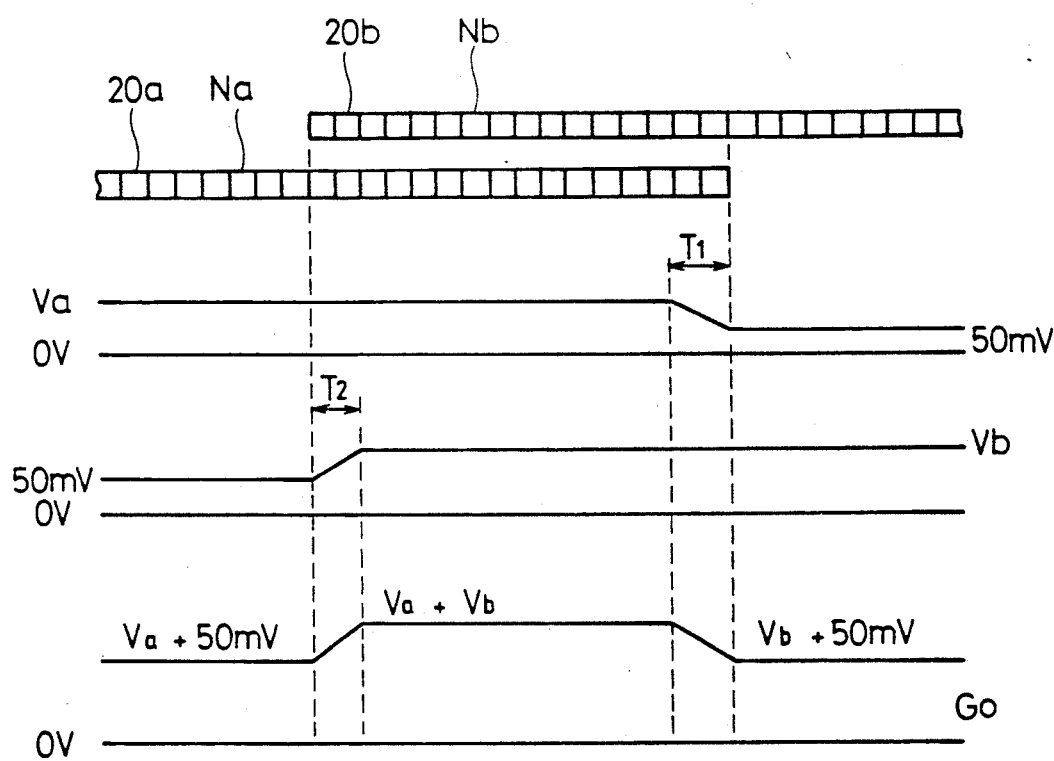
FIG. 5 is a diagram showing the manner in which an electric image signal varies when image sensor output signals are added to each other.

The output signals from the image sensors 20a, 20b are added to each other where they optically overlap each other. As shown in FIGS. 3 and 5, a photoelectrically converted output signal Va from the image sensor 20a is multiplied by the constants stored in the memory 45 by the multiplier 44. Therefore, the level of the output signal from the image sensor 20a is gradually reduced with time from the value Va to the offset level during the interval T1 (where the output signals from the image sensors 20a, 20b stop being added to, or overlapping, each other).

A photoelectrically converted output signal Vb from the image sensor 20b is multiplied by the constants stored in the memory 47 by the multiplier 46. Therefore, the level of the output signal from the image sensor 20b is gradually increased with time from the offset level to the value Vb during the interval T2 (where the output signals from the image sensors 20a, 20b start being added to, or overlapping, each other).

Consequently, when the output signals from the image sensors 20a, 20b are added to each other, the output signal from the adder 56, i.e., the corrected image signal Go varies smoothly in level.

When the output signals from the image sensors 20c, 20b are added to each other, the resultant sum signal, i.e., the output signal or corrected image signal Go from the adder 56 also varies smoothly in level.

With the above embodiment, as described above, when the output signals from adjacent two of the three image sensors 20a through 20c, i.e., the image sensors 20a, 20b and the image sensors 20c, 20b, are added, one of the output signals is gradually reduced with time from the actual signal level to the offset level and the other output signal is gradually increased with time from the offset level to the actual signal level.

Since the added output signals from the image sensors 20a, 20b vary gradually or smoothly, the corrected image signal Go applied to the signal processing circuit 26 has a smooth continuous output value. Accordingly, the reproduced image is free from abrupt brightness irregularities which would otherwise be caused by sharp level differences in the output signals.

The numbers to be counted by the counters 48, 50 are not limited to the value described above, but may be varied. The constants stored in the memories 45, 47 correspondingly to the numbers to be counted are also not limited to the illustrated values, but may suitably be selected.

The number of the image sensors used is not limited to the illustrated value. The image signal processing method of the present invention is applicable to a plurality of image sensors whose output signals are added to each other in regions where adjacent two of the image sensors optically overlap each other.

The applicant has previously proposed an image signal processing method which corrects added output signals from image sensors into a substantially flat signal level (see Japanese Patent Application No. 1(1989)-32025). If an image sensor or another analog circuit suffers a drift while a photographic film is being exposed to a laser beam from a laser beam scanner (similar to the laser beam scanner 30 shown in FIG. 1) and hence the output signals which are corrected into a fat signal level according to the above proposed image signal processing method are subjected to a level difference or irregularity, then the image signal processing method according to the present invention may be applied to cause such a level difference or irregularity to vary smoothly. Consequently, any abrupt brightness irregularity in the reproduced image can be avoided.

With the image signal processing method according to the present invention, as described above, the two output signals from two adjacent image sensors, which are added to each other, are gradually increased or reduced with time between the actual output signal levels and a predetermined offset level. Therefore, the image signal produced by adding the output signals is free from sharp level shifts, but varies smoothly in level. Since the overlapping or added output signals from the image sensors smoothly vary, any abrupt brightness irregularity which would otherwise result from a sharp level shift in the image signal is effectively reduced.

Although a certain preferred embodiment has been shown and described, it should be understood that many changes and modifications may be made therein without departing from the scope of the appended claims.

What is claimed is:

1. A method of processing an image signal which is produced by combining output signals from arrays of photoelectric transducer elements of at least adjacent image sensors, each of said image sensors producing a characteristic dark voltage level, while adding said output signals partly together during an overlapping interval such that output signals from all of the image sensors are combined into an image signal representative of image information along one main scanning line, said method comprising the steps of: together gradually increasing one of the output signals from an actual level thereof to a predetermined offset level during a first portion of said overlapping interval corresponding to a starting interval in which said output signals start being added to each other; and gradually reducing the other of the output signals from said predetermined offset level to an actual level thereof in a second portion of said overlapping interval corresponding to an ending interval in which said output signals stop being added to each other, wherein the output signals are smoothly combined with each other irrespective of variation in dark voltage level between said output signals.

2. A method according to claim 1, wherein said gradually increasing step comprises the step of:

multiplying said one of the added output signals by a coefficient signal which gradually increases from a time when said output signals start being added to each other, and wherein said gradually reducing step comprises the step of:

multiplying said other of the added output signals by a coefficient signal which gradually decreases up to a time when said output signals stop being added to each other, said method further including the step of:

adding the multiplied output signals to each other to smoothly combine the output signals with each other.

* * * * *